US012596511B2

(12) United States Patent (10) Patent No.: US 12,596,511 B2
Tanigawa et al. (45) Date of Patent: Apr. 7, 2026

(54) INFORMATION PROCESSING METHOD, INFORMATION PROCESSING DEVICE, AND NON-TRANSITORY COMPUTER READABLE RECORDING MEDIUM

(71) Applicant: Panasonic Intellectual Property Corporation of America, Torrance, CA (US)

(72) Inventors: Risako Tanigawa, Kanagawa (JP); Shun Ishizaka, Tokyo (JP); Kazuki Kozuka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/948,146

(22) Filed: Nov. 14, 2024

(65) Prior Publication Data

US 2025/0068372 A1 Feb. 27, 2025

Related U.S. Application Data

(63) Continuation of application No. PCT/JP2023/018260, filed on May 16, 2023.

(Continued)

(30) Foreign Application Priority Data

Apr. 24, 2023 (JP) ................................. 2023-071104

(51) Int. Cl.
G06F 3/14 (2006.01)
G06F 3/04817 (2022.01)
(Continued)

(52) U.S. Cl.
CPC ............ *G06F 3/14* (2013.01); *G06F 3/04817* (2013.01); *G06T 5/50* (2013.01); *G06V 20/70* (2022.01); *G06T 2207/20221* (2013.01)

(58) Field of Classification Search
CPC .... G06F 3/14; G06F 3/04817; G06F 3/04815; G06F 3/04845; G06T 5/50;
(Continued)

(56) References Cited

U.S. PATENT DOCUMENTS

2017/0083796 A1* 3/2017 Kim ..................... G06V 10/454
2017/0262727 A1* 9/2017 Kozuka ............... G06F 18/2155
(Continued)

FOREIGN PATENT DOCUMENTS

JP 2021-086224 6/2021

OTHER PUBLICATIONS

International Search Report issued in International Pat. Appl. No. PCT/JP2023/018260, dated Jul. 18, 2023, along with an English translation thereof.

*Primary Examiner* — Sahlu Okebato
(74) *Attorney, Agent, or Firm* — Greenblum & Bernstein, P.L.C.

(57) ABSTRACT

An information processing device includes, in a case where a selection of a first photography point icon that is one of a plurality of photography point icons is detected, displaying a first image corresponding to the first photography point icon on a display, in which the displaying of the first image on the display includes determining whether annotation information is associated with a second photography point icon that is within a predetermined range from the first photography point icon, and upon determination that the annotation information is associated with the second photography point icon, displaying the first image and the annotation information on the display.

9 Claims, 11 Drawing Sheets

Related U.S. Application Data

(60) Provisional application No. 63/342,805, filed on May 17, 2022.

(51) Int. Cl.
    *G06T 5/50*        (2006.01)
    *G06V 20/70*        (2022.01)
(58) Field of Classification Search
    CPC .......... G06T 2207/20221; G06V 20/70; H04L
                51/212; H04L 51/10; H04L 51/214;
                                              H04N 23/80
    See application file for complete search history.

(56)                References Cited

U.S. PATENT DOCUMENTS

2017/0336958 A1*  11/2017  Chaudhri ............. H04N 23/631
2023/0169422 A1*   6/2023  Sawada .................. G06Q 50/08
                                                      705/7.13

* cited by examiner

INFORMATION PROCESSING METHOD, INFORMATION PROCESSING DEVICE, AND NON-TRANSITORY COMPUTER READABLE RECORDING MEDIUM

FIELD OF INVENTION

The present disclosure relates to a technique of displaying a selected image.

BACKGROUND ART

Patent Literature 1 discloses displaying an image (e.g., a contour line) indicating a designated area designated by a worker on a bird's-eye photographed image of a work site, and displaying chatting related to the designated area input by the worker into a display field provided next to the bird's-eye photographed image.

However, the related art disclosed in Patent Literature 1 fails to disclose that an image obtained by photographing at the site indicated by the bird's-eye photography image is displayed on a display in response to a selection instruction by a user. Therefore, the related art also fails to disclose displaying annotation information in association with the first image displayed on the display in response to the selection instruction by the user. Therefore, the related art does not allow the user to check the annotation information set to the second image without separately inputting an operation of selecting the second image different from the first image while viewing the first image.

Patent Literature 1: JP 2021-86224 A

SUMMARY OF THE INVENTION

The present disclosure has been made to solve such a problem, and an object of the present disclosure is to provide a technology of allowing a user to check annotation information set for a second image without inputting an operation of selecting a second image different from a first image while viewing the first image.

An information processing method according to an aspect of the present disclosure is an information processing method in a computer, the method including displaying, on a display of a terminal device, an overhead view image in which a plurality of photography point icons indicating a photography point are superimposed, and in a case where a selection of a first photography point icon that is one of the plurality of photography point icons is detected, displaying a first image corresponding to the first photography point icon on the display, in which the displaying of the first image on the display includes determining whether annotation information is associated with a second photography point icon that is within a predetermined range from the first photography point icon, and upon determination that the annotation information is associated with the second photography point icon, displaying the first image and the annotation information on the display.

This configuration allows the user to check the annotation information set to the second image without separately inputting an operation of selecting the second image different from the first image while viewing the first image.

BRIEF DESCRIPTION OF THE DRAWINGS

FIG. 10 is a diagram illustrating an example of a display mode of the first image.

FIG. 11 is a diagram illustrating a first image in which an annotation icon is displayed in association with a second annotation region.

DETAILED DESCRIPTION

Figure 1:
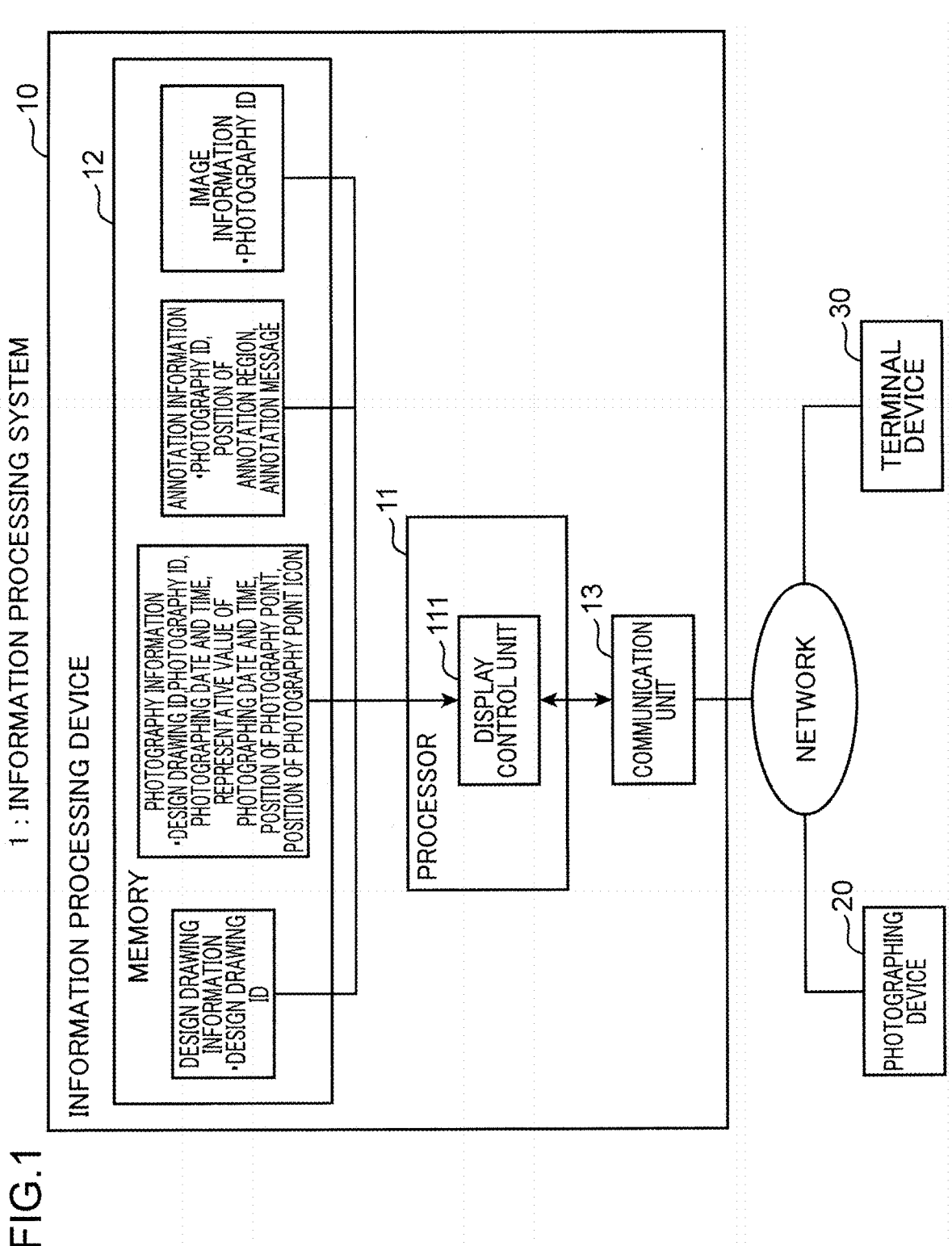
FIG. 1 is a block diagram illustrating an example of a configuration of an information processing system according to an embodiment of the present disclosure.

Process Leading to One Aspect of the Present Disclosure

Problems at a construction site include communication problems that a specific instruction is not transmitted to a worker and that it takes time to explain the instruction, and problems of checking of a construction site that it requires many people to go around the entire construction site and that it takes time to move to the construction site.

In order to solve such problems, for example, it is conceivable that a large number of cameras are installed at a construction site, and a site supervisor who is remote gives an instruction to a worker while referring to images obtained from the large number of cameras. However, in the construction site, as construction progresses, work such as removing an installed sensor or installing the removed sensor in another place occurs. Since this kind of work takes time and effort, it is not practical installing a sensor at a construction site. Therefore, the inventors have studied a technique that can remotely check in detail the situation of the construction site without installing a sensor.

Then, it has been found that, when an operation of selecting a certain position is input on a design drawing of the construction site displayed on the display, if there is an image of the construction site photographed in advance at the certain position and a user interface that allows the user to input an annotation by designating a region in the image, the details of the situation of the construction site can be checked from a remote location.

By the way, a case is assumed in which the user desires to check an annotation set to the second image photographed at the photography point near the first image while viewing the first image selected and displayed in this way. In this case, the user is requested to input an operation of closing the first image and selecting a photography point of the second image from the user interface. Such an operation takes time and effort of the user.

Therefore, the inventors have found that, in a case where an annotation is set to a second image photographed near the first image, if the annotation is displayed together with the first image, the annotation set to the second image can be checked while the first image is viewed without performing such an operation, and the inventors have arrived at the present disclosure.

(1) An information processing method according to an aspect of the present disclosure is an information processing method in a computer, the method including displaying, on a display of a terminal device, an overhead view image in which a plurality of photography point icons indicating a photography point are superimposed, and in a case where a selection of a first photography point icon that is one of the plurality of photography point icons is detected, displaying a first image corresponding to the first photography point icon on the display, in which the displaying of the first image on the display includes determining whether annotation information is associated with a second photography point icon that is within a predetermined range from the first photography point icon, and upon determination that the annotation information is associated with the second photography point icon, displaying the first image and the annotation information on the display.

In this configuration, in a case where the annotation information is associated with the second photography point icon within the predetermined range from the first photography point icon corresponding to the first image, the first image is displayed in association with the annotation information. Therefore, the annotation information set to the second image can be checked without separately inputting an operation of closing the first image and displaying the second image while viewing the first image. Since the annotation information can be checked without such an operation, the number of processing steps of the computer spent for the operation is reduced.

(2) In the information processing method according to (1), the annotation information may include a position of an annotation region in which an annotation is set in a second image corresponding to the second photography point icon, and the displaying of the first image on the display may include detecting a corresponding region corresponding to the annotation region from the first image based on the second image, and displaying, on the display, the first image in which the annotation region is superimposed on the corresponding region.

In this configuration, since the annotation information can be displayed at the position on the first image corresponding to the annotation information set on the second image, it is possible to easily check which subject the annotation information set on the second image is set to.

(3) In the information processing method according to (1) to (2), the displaying of the first image on the display may further include, in a case where the annotation information is associated with the first photography point icon, displaying the annotation information associated with the first photography point icon and the annotation information associated with the second photography point icon on the display.

This configuration makes it possible to simultaneously check the annotation information associated with the first photography point icon and the annotation information associated with the second photography point icon.

(4) In the information processing method according to any one of (1) to (3), the annotation information may include a position of a first annotation region indicating a region in which an annotation is set in the first image and a position of a second annotation region in which an annotation is set in a second image corresponding to the second photography point icon, and the displaying of the first image on the display may include detecting a corresponding region corresponding to the second annotation region from the first image based on the second image, and in a case where the first annotation region is set to the first image, displaying, on the display, the first image on which the first annotation region is superimposed and in which the second annotation region is superimposed on the corresponding region.

In this configuration, the first annotation region and the second annotation region can be simultaneously checked in the first image.

(5) In the information processing method according to any one of (1) to (4), the displaying of the first image on the display may include displaying the annotation information associated with the first photography point icon and the annotation information associated with the second photography point icon by using different display objects.

This configuration makes it possible to easily distinguish the annotation information associated with the first photography point icon and the annotation information associated with the second photography point icon.

(6) The information processing method according to any one of (1) to (5) may further include displaying a selection icon configured to be movable on the overhead view image, in which the first photography point icon is decided based on a distance between a movement completion position of the selection icon and each of the plurality of photography point icons.

In this configuration, since the photography point icon can be selected by moving the selection icon on the overhead view image, the photography point icon can be intuitively selected.

(7) The information processing method according to any one of (1) to (6) may further include, in a case where selection of the annotation information displayed on the display is detected, displaying, on the display, an annotation message indicated by the annotation information.

In this configuration, the annotation message indicated by the annotation information can be checked as necessary.

(8) An information processing device according to another aspect of the present disclosure is an information processing device including a processor, in which the processor executes processing of: displaying, on a display of a terminal device, an overhead view image in which a plurality of photography point icons indicating a photography point are superimposed; and in a case where a selection of a first photography point icon that is one of the plurality of photography point icons is detected, displaying a first image corresponding to the first photography point icon on the display, and the displaying of the first image on the display includes determining whether annotation information is associated with a second photography point icon that is within a predetermined range from the first photography point icon, and upon determination that the annotation information is associated with the second photography point icon, displaying the first image and the annotation information on the display.

This configuration can provide an information processing device that allows the annotation information set to the second image to be checked without separately inputting an operation of closing the first image and displaying the second image while viewing the first image.

(9) An information processing program according to still another aspect of the present disclosure causes a computer to execute the information processing method according to any one of (1) to (7).

This configuration can provide an information processing program that allows the annotation information set to the second image to be checked without separately inputting an operation of closing the first image and displaying the second image while viewing the first image.

The present disclosure can be also implemented as an information processing system that is operated by such an information processing program. It is needless to say that such a computer program can be distributed via a computer-readable non-transitory recording medium such as a CD-ROM, or via a communication network such as the Internet.

Note that each of the embodiments to be described below shows one specific example of the present disclosure. Numerical values, shapes, components, steps, an order of steps, and the like shown in the embodiments below are merely one example, and are not intended to limit the present disclosure. A component that is not described in an independent claim representing the highest concept among components in the embodiments below is described as an arbitrary component. In all the embodiments, respective contents can be combined.

Embodiment

FIG. 1 is a block diagram illustrating an example of a configuration of an information processing system 1 according to an embodiment of the present disclosure. The information processing system 1 includes an information processing device 10, a photographing device 20, and a terminal device 30. The information processing device 10, the photographing device 20, and the terminal device 30 are communicably connected via a network. An example of the network is the Internet. The information processing device 10 is, for example, a cloud server including one or a plurality of computers. However, this is an example, and the information processing device 10 may be configured by an edge server or may be implemented in the terminal device 30.

The photographing device 20 is configured by, for example, an omnidirectional camera, and photographs an image at a predetermined frame rate. The photographing device 20 is, for example, a portable photographing device carried by the user. The user is, for example, a worker and a site supervisor at a construction site. The user moves in the construction site while photographing the construction site with the photographing device 20. The photographing device 20 transmits image information indicating a photographed image to the information processing device 10 via the network. In the image information, the position of photography point indicating the photography point is associated with the photographing date and time. The position of photography point is acquired by, for example, a position sensor such as a magnetic sensor or a GPS sensor included in the photographing device 20, and is represented by latitude and longitude. The photographing date and time is acquired by, for example, a clock included in the photographing device 20. This enables the information processing device 10 to obtain image information at a plurality of photography points in the construction site. Here, since the photographing device 20 photographs an image at a predetermined frame rate, the photography point is defined on a frame period basis. However, this is an example, and the photography point may be defined every predetermined time (for example, one second, one minute, etc.). The photographing device 20 includes an image sensor, an operation device, a communication circuit, a signal processing circuit, and the like. The photographing device 20 may be configured by a portable computer such as a smartphone or a tablet computer.

The terminal device 30 is carried by the user. The terminal device 30 may be configured by, for example, a portable computer such as a smartphone or a tablet computer, or may be configured by a stationary computer. The terminal device 30 displays the image information on the display under the control of the information processing device 10. Although one terminal device 30 is illustrated in the example of FIG. 1, a plurality of terminal devices may be connected to the information processing device 10 via the network. The terminal device 30 includes a central processing unit (CPU), a memory, a display, an operation device such as a touch-screen and a keyboard, and a communication circuit.

The information processing device 10 includes a processor 11, a memory 12, and a communication unit 13. The processor 11 includes, for example, a central processing unit (CPU). The processor 11 includes a display control unit 111. The display control unit 111 may be implemented by the processor 11 executing the information processing program, or may be configured by a dedicated hardware circuit such as an ASIC.

The display control unit 111 acquires an instruction to select a design drawing from the user from the terminal device 30, reads design drawing information indicated by the instruction from the memory 12, and displays the read design drawing information on the display of the terminal device 30. The design drawing information is information indicating a design drawing of a construction site. The design drawing information is an example of an overhead view image. The display control unit 111 displays a photography point icon for selecting an arbitrary position in the design drawing in a superimposed manner in the design drawing. When acquiring an instruction to select photographing date and time by the user from the terminal device 30, the display control unit 111 displays a plurality of photography point icons indicating photography points on the photographing date and time in a superimposed manner in the design drawing. These displays are achieved by the display control unit 111 transmitting a display instruction to the terminal device 30 by using the communication unit 13. The selection icon is configured movably on the design drawing. In the design drawing, latitude and longitude are associated in advance with a position to be a key point. The position to be a key point is, for example, the position of four corners of the design drawing.

The display control unit 111 detects selection of the first photography point icon which is one photography point icon by acquiring an instruction to select one photography point icon from among the plurality of photography point icons from the terminal device 30. When detecting the selection of the first photography point icon, the display control unit 111 displays a first image corresponding to the first photography point icon on the display of the terminal device 30. The first image is an image photographed at the photography point indicated by the first photography point icon. The first image is an omnidirectional image. Note that this is an example, and the first image may be a panoramic image.

The display control unit 111 executes the following processing when displaying the first image. The display control unit 111 determines whether the annotation information is associated with the second photography point icon within a predetermined range from the first photography point icon. Then, when determining that the annotation information is associated with the second photography point icon, the display control unit 111 displays the first image on the display of the terminal device 30 in association with the annotation information. The second photography point icon is a photography point icon within a certain distance range around the position (coordinates) of the first photography point icon. In the following description, for convenience of explanation, the second photography point icon indicates two photography point icons adjacent to the left and right of the first photography point. However, this is an example, and the second photography point icon may be n (an integer of two or more) photography point icons located on the left side of the first photography point icon and n photography point icons located on the right side. As the certain distance range, for example, a distance can be adopted at which the photography point of the first image and the photography point of the second image are so close to each other that it is considered the same subject is included in the first image and the second image.

The annotation information includes a position on the image of the annotation region in which the annotation is set. Hereinafter, the annotation region set to the first image is referred to as a first annotation region, and the annotation region set to the second image is referred to as a second annotation region. The display control unit 111 detects a corresponding region corresponding to the second annotation region from the first image on the basis of the second image, and displays the first image in which the second annotation region is superimposed on the corresponding region on the display of the terminal device 30. In this case, the display control unit 111 is only required to transmit the display instruction of the first image to the terminal device 30 via the communication unit 13. The first annotation region and the second annotation region are displayed by using different display objects. For example, the display object in the first annotation region and the display object in the second annotation region are displayed in different colors, shapes, and the like.

The annotation region is a region set by the user by performing an operation of moving and deforming a rectangular frame body displayed to be superimposed on the first image or the second image. The display control unit 111 is only required to detect the corresponding region from the first image by applying pattern matching using the second annotation region as a template to the first image. Alternatively, first, the display control unit 111 recognizes an object included in the second annotation region by using an object recognizer created in advance with machine learning such as deep learning. Next, the display control unit 111 recognizes an object included in the first image by using the object recognizer. Finally, the display control unit 111 may detect a region on the first image displaying the same object as the object included in the second annotation region as the corresponding region.

In a case where the annotation information is associated with the first photography point icon, the display control unit 111 may further display the annotation information associated with the first photography point icon on the display of the terminal device 30.

Specifically, in a case where the first annotation region is set to the first image, the display control unit 111 displays the first image further superimposed with the first annotation region on the display of the terminal device 30.

The memory 12 includes a nonvolatile rewritable storage device such as a hard disk drive or a solid state drive. The memory 12 stores design drawing information, photography information, annotation information, and image information. The design drawing information is image information indicating a design drawing. The design drawing information is associated with a design drawing ID for identifying the design drawing. In the design drawing, latitude and longitude of an actual construction site are set as a key point as described above.

The photography information indicates information regarding one photographing operation using the photographing device 20. The photography information is generated every time one photographing operation is performed. One photographing operation refers to a series of operations from the start of photographing to the end of photographing at the construction site by a worker with the photographing device 20. A plurality of images is photographed by one photographing operation. The photography information includes a design drawing ID, a photography ID, a photographing date and time, a representative value of photographing date and time, a position of photography point, and a position of photography point icon. The photography ID is an identifier for identifying each photography included in one photographing operation. The photographing date and time is photographing date and time of the photography indicated by the photography ID. The representative value of photographing date and time is photographing date and time when photography is started. The photography point indicates a position (latitude and longitude) at which photography indicated by the photography ID is performed. The position of photography point icon indicates a display position (coordinates) on the design drawing of the photography point icon corresponding to the photography ID. The position of photography point icon is calculated by mapping the photography position onto the design drawing based on the photography position (latitude and longitude) at the key point of the design drawing indicated by the design drawing information and the photography point (latitude and longitude) corresponding to the photography ID.

The annotation information is information indicating an annotation. One piece of annotation information corresponds to one annotation. The annotation information includes a photography ID, a position of an annotation region, and an annotation message. The annotation message is textual information input by the user as an annotation.

The image information indicates one image photographed by each image included in one photographing operation. In other words, the image information indicates the first image or the second image described above. The photography ID is associated with the image information.

In this manner, since the photography information and the image information are associated with the photography ID, the image associated with the photography point icon is designated using the photography ID as a key. Since the photography information and the annotation information are associated with the photography ID, the annotation information corresponding to the photography point icon is specified using the photography ID as a key. Since the annotation information includes the photographing ID, the position of the annotation region, and the annotation message, and the image information is associated with the photography ID, the position of the annotation region set to the image and the annotation message are specified using the photography ID as a key.

The communication unit 13 is a communication circuit that connects the information processing device 10 to the network.

Figure 2:
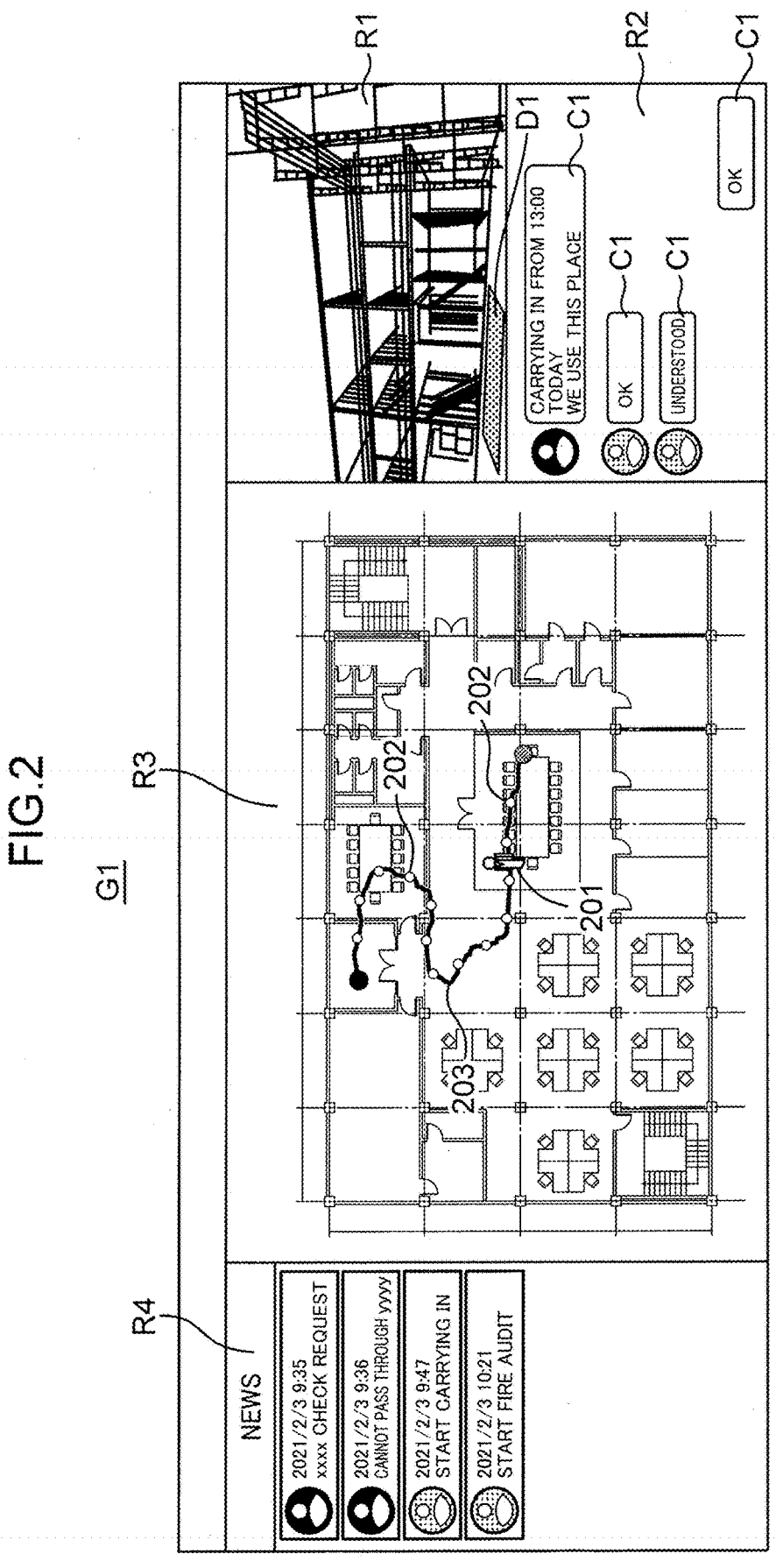
FIG. 2 is a diagram illustrating an example of a display screen displayed on a display of a terminal device.

FIG. 2 is a diagram illustrating an example of a display screen G1 displayed on the display of the terminal device 30. The display screen G1 is a basic screen of an application provided by the information processing device 10. The display screen G1 includes an image information display field R1, an annotation information display field R2, a design drawing display field R3, and a news display field R4.

The image information display field R1 displays the first image associated with the first photography point icon.

The annotation information display field R2 displays annotation information associated with the first photography point icon. Here, annotation messages C1 input by a plurality of users to the first image displayed in the image information display field R1 are listed. In the annotation information display field R2, an annotation message C1 input by a user other than the user himself/herself is displayed on the left side, and an annotation message C1 input by the user himself/herself is displayed on the right side.

In the default display screen G1 immediately after the application is activated, the photography point icon is not selected by the user. Therefore, in the default display screen G1, the image information display field R1 and the annotation information display field R2 are blank.

The design drawing display field R3 displays a design drawing of the construction site. In the design drawing displayed in the design drawing display field R3, a selection icon 201, a photography point icon 202, and a trajectory 203 are displayed in a superimposed manner.

The selection icon 201 is configured movably by a drag and drop operation. In this example, the selection icon 201 includes an image simulating a human.

The photography point icon 202 is an icon indicating a photography point, and is associated with an image photographed at the photography point. In this example, the photography point icon 202 includes a circular image. The trajectory 203 indicates a trajectory of a user who has photographed the image. In this example, the trajectory 203 includes a line connecting the adjacent photography point icons 202. The photography point icon 202 positioned at the leading end of the trajectory 203 and the photography point icon 202 positioned at the trailing end of the trajectory 203 are displayed in a larger size than the other photography point icons. The photography point icon 202 positioned at the leading end (e.g., the right end) of the trajectory 203 indicates a photography start position, and the photography point icon 202 positioned at the trailing end (e.g., the left end) of the trajectory 203 indicates a photography end position.

When operation (e.g., tap or click) of selecting an image displayed in the image information display field R1 is input, the design drawing display field R3 displays the image displayed in the image information display field R1 in the design drawing display field R3.

The news display field R4 displays various messages related to this construction site, the messages being input by the user.

For example, in a case where the selection icon 201 is dropped in a predetermined region of any of the photography point icons 202, the photography point icon 202 is decided as a first photography point icon, and an image corresponding to the first photography point icon is detected as the first image. Then, the first image is displayed in the image information display field R1. In this case, in a case where the annotation information is associated with the first photography point icon, the annotation information corresponding to the first photography point icon is displayed in the annotation information display field R2.

For example, it is assumed that the selection icon 201 is not dropped in the predetermined region in any of the photography point icons 202. In this case, a photography point icon having the shortest distance to the dropping position and associated with the annotation information is decided as a first photography point icon, and an image corresponding to the first photography point icon is detected as the first image. Then, the first image is displayed in the image information display field R1, and annotation information corresponding to the first image is displayed in the annotation information display field R2.

Figure 3:
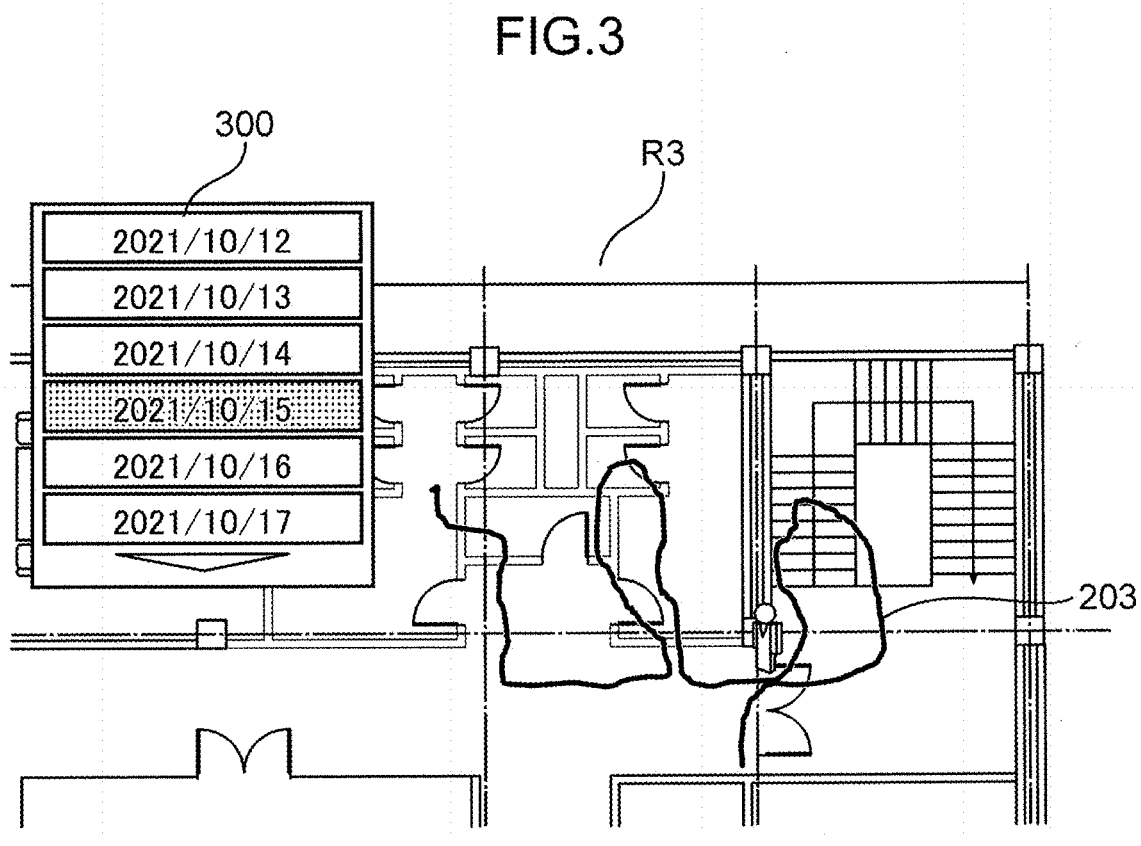
FIG. 3 is a diagram illustrating an example of a menu screen for selecting photographing date and time.

FIG. 3 is a drawing illustrating an example of a menu screen 300 for selecting photographing date and time. The menu screen 300 is displayed in a case where predetermined operation for displaying the menu screen 300 is performed on the display screen G1. The menu screen 300 displays a list of a plurality of photographing dates and times of photographing at one construction site. One photographing date and time included in the menu screen 300 indicates a representative value of photographing date and time of one photographing operation.

In a case where the user inputs an instruction to select one photographing date and time from the menu screen 300, the display control unit 111 acquires the instruction from the terminal device 30. Then, the display control unit 111 transmits, to the terminal device 30, a display instruction to superimpose and display a trajectory 203 corresponding to photographing date and time indicated by the acquired instruction in a superimposed manner in the design drawing display field R3. As a result, the user can display the trajectory 203 corresponding to the selected photographing date and time on the design drawing display field R3. In the display screen G1 that is first displayed after the application is activated, the trajectory 203 corresponding to the latest photographing date and time is displayed in the design drawing display field R3. Although in FIG. 3, the photography point icon 202 is omitted for convenience of description, the photography point icon 202 is actually also displayed as illustrated in FIG. 2.

Figure 4:
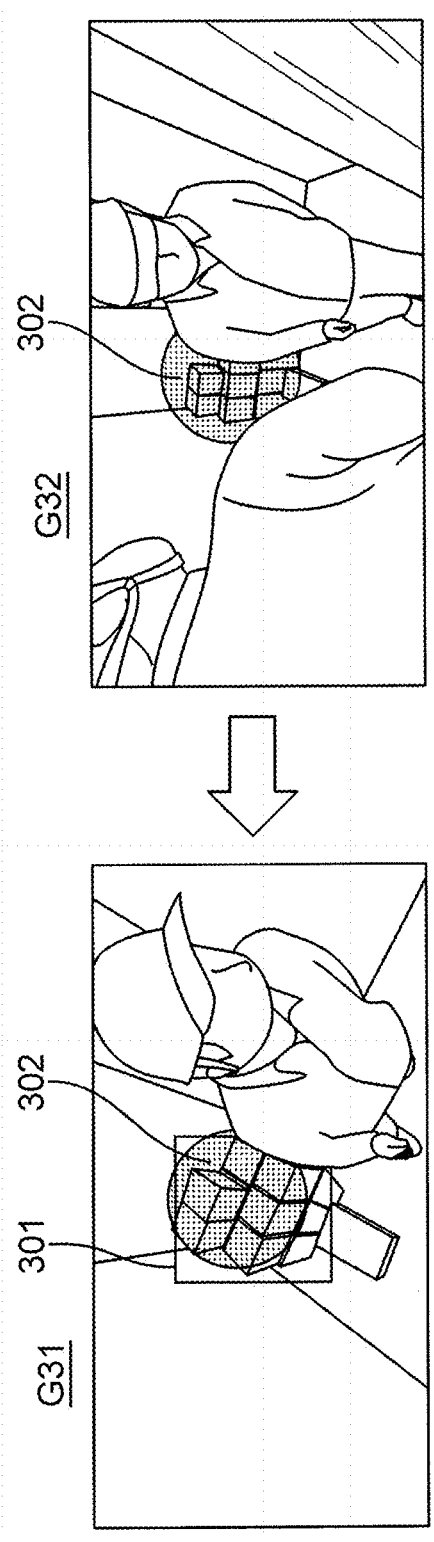
FIG. 4 is a diagram illustrating an example of a first image displayed on the display.

FIG. 4 is a diagram illustrating an example of a first image G31 displayed on the display. In FIG. 4, the left side shows the first image G31, and the right side shows a second image G32. A rectangular frame body in the first image G31 indicates a first annotation region 301. A circular region in the first image G31 and the second image G32 indicates a second annotation region 302. In the first image G31, a second annotation region 302 set to the second image G32 is displayed in addition to the first annotation region 301 set to the first image G. The second annotation region 302 displayed in the first image G31 is displayed in a corresponding region on the first image G31 of the second annotation region 302 included in the second image G32. Therefore, the user can check the second annotation region 302 on the first image G31 without inputting an operation of displaying the second image G32 while viewing the first image G31. In the example of FIG. 4, since the first annotation region and the second annotation region are set for the same subject, the first annotation region and a second annotation region are displayed in an overlapping manner. Since the first image G31 and the second image G32 are omnidirectional images, the first image G31 displayed on the display is a partial region of the entire region of the first image in the example of FIG. 4.

Figure 5:
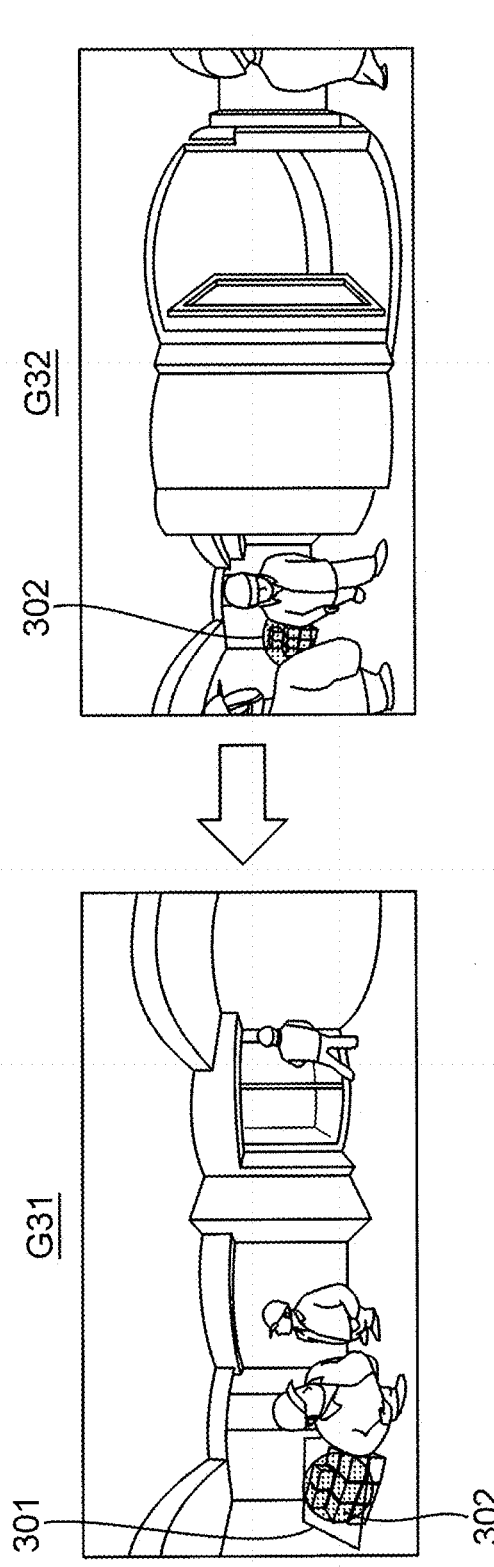
FIG. 5 is another diagram illustrating an example of a first image displayed on the display.

FIG. 5 is a diagram illustrating another example of the first image G31 displayed on the display. In the example of FIG. 5, a developed image obtained by developing the entire region of the omnidirectional image is adopted as the first image G31 and the second image G32. Therefore, in the example of FIG. 5, the first image G31 and the second image G32 are distorted, but the entire region of the first image G31 and the second image G32 are displayed on the display. In the example of FIG. 5, as in the case of FIG. 4, the second annotation region 302 set to the second image G32 is displayed in the first image G31 in addition to the first annotation region 301 set to the first image G. The display control unit 111 generates a developed image of the first image G31 and the second image G32 by using equidistant projection, fisheye projection, or the like.

Figure 6:
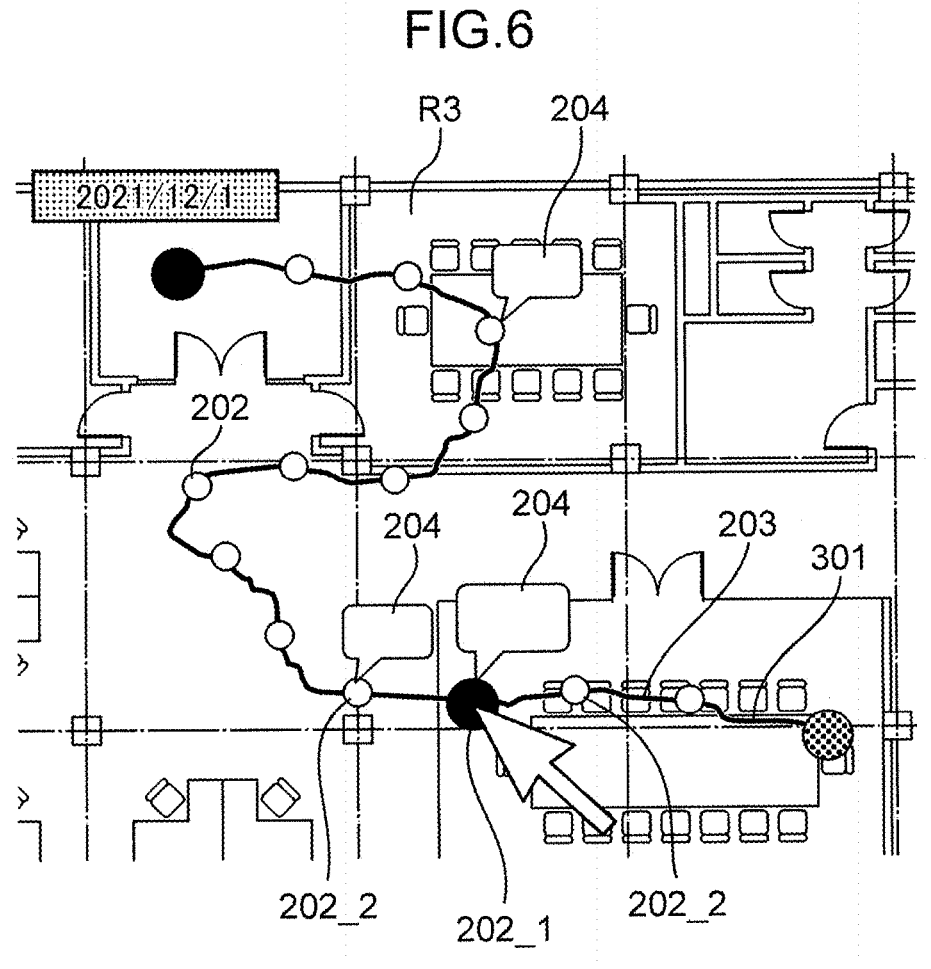
FIG. 6 is a diagram illustrating a detailed configuration of a design drawing image display field.

FIG. 6 is a diagram illustrating a detailed configuration of the design drawing display field R3. In the example of FIG. 6, an annotation icon 204 is displayed in association with the photography point icon 202 associated with the annotation information. As the annotation icon 204, a balloon mark starting from the corresponding photography point icon 202 is adopted. The annotation icon 204 only indicates that the annotation information is associated, and does not display an annotation message. In the example of FIG. 6, the photography point icon 202 indicated by an arrow is decided as a first photography point icon 202_1. Therefore, two of the photography point icon 202 adjacent on the left of the first photography point icon 202_1 and a photography point icon 202 adjacent on the right are second photography point icons 202_2. Of the two second photography point icons 202_2, the left second photography point icon 202_2 is associated with annotation information. Therefore, the first image corresponding to the first photography point icon 202_1 is displayed with the second annotation region corresponding to the second photography point icon 202_2 on the left superimposed. The annotation information is also associated with the first photography point icon 202_1. Therefore, the first annotation region corresponding to the first photography point icon 202_1 is also superimposed and displayed on the first image.

Figure 7:
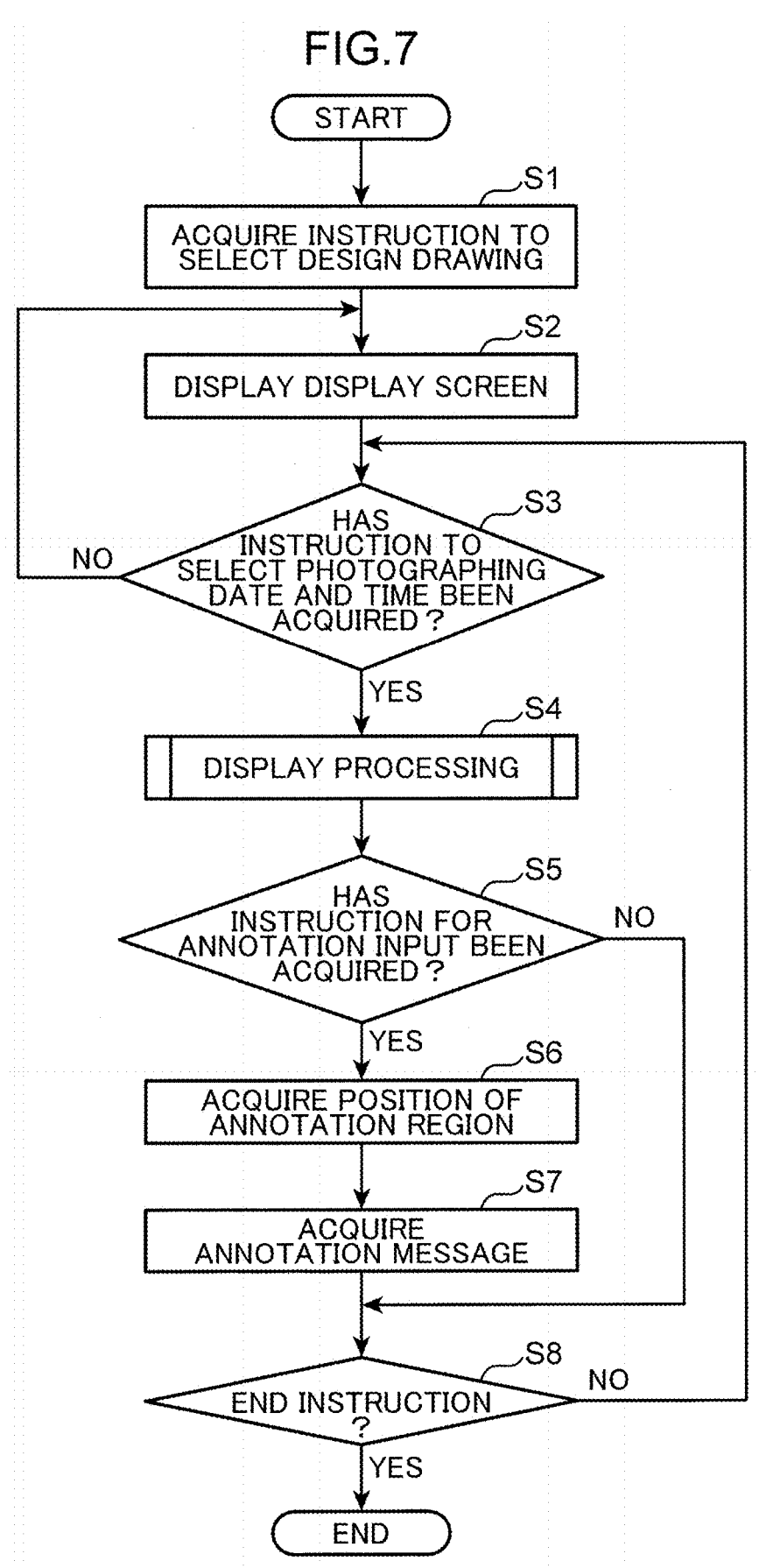
FIG. 7 is a flowchart illustrating an example of processing of an information processing device illustrated in FIG. 1.

FIG. 7 is a flowchart illustrating an example of the processing of the information processing device 10 illustrated in FIG. 1. The display control unit 111 acquires an instruction from a user who selects a design drawing (step S1). In this case, a menu screen for selecting a design drawing is displayed on the display of the terminal device 30, and an instruction to select one design drawing from the menu screen is input. The input instruction is transmitted to the information processing device 10 via the network and received by the communication unit 13. The display control unit 111 acquires the instruction via the communication unit 13. Since this instruction includes the design drawing ID, the display control unit 111 can acquire design drawing information indicating an instructed design drawing from the pieces of the design drawing information stored in the memory 12.

Next, the display control unit 111 displays the display screen G1 on the display of the terminal device 30 by transmitting a display instruction on the display screen G1 to the terminal device 30 via the communication unit 13 (step S2). The display instruction of the display screen G1 displayed by default includes the design drawing information indicating the design drawing selected in step S1 and the photography information associated with the latest photographing date and time. Therefore, as illustrated in FIG. 2, the display screen G1 displayed by default includes the selection icon 201, and the photography point icon 202 and the trajectory 203 corresponding to the latest photographing date and time in the design drawing. At this time point, since the first photography point icon is yet to be decided, the image information display field R1 and the annotation information display field R2 are blank. Note that, in a case where an instruction to select the photographing date and time is input in step S3 to be described later, the display control unit 111 displays, on the display, the display screen G1 including a design drawing in which the photography point icon 202 and the trajectory 203 corresponding to the selected photographing date and time are displayed in a superimposed manner.

Next, the display control unit 111 determines whether an instruction from the user for selecting the photographing date and time has been acquired (step S3). In this case, the menu screen 300 for selecting photographing date and time is displayed on the display of the terminal device 30. The user inputs an instruction to select one photographing date and time from the menu screen 300. The photographing date and time displayed on the menu screen 300 is a representative value of the photographing date and time included in the photography information stored in the memory 12. When the photographing date and time is selected, one photographing operation corresponding to the photographing date and time is selected. The input instruction is transmitted to the information processing device 10 via the network and received by the communication unit 13. The display control unit 111 acquires the instruction via the communication unit 13. Since this instruction includes the representative value of the photographing date and time, the display control unit 111 can specify one piece of the photography information stored in the memory 12. In a case where the instruction to select the photographing date and time is input (YES in step S3), the processing proceeds to step S4. In a case where the instruction to select the photographing date and time is not input (NO in step S3), the processing returns to step S2.

Next, display processing is executed (step S4). Details of the display processing will be described later with reference to FIG. 8. The display processing is processing of displaying the first image in the image information display field R1.

Next, the display control unit 111 determines whether an annotation input instruction has been acquired (step S5). The annotation input instruction is an instruction input in a case where the user intends to input an annotation to the image displayed in the image information display field R1. This instruction is input by performing an operation for selecting an annotation input instruction button (not illustrated) displayed on the display screen G1, for example. The input instruction is transmitted to the information processing device 10 via the network and received by the communication unit 13. The display control unit 111 acquires the instruction via the communication unit 13.

Next, in a case where the annotation input instruction has been acquired (YES in Step S5), the display control unit 111 acquires the position of the annotation region (step S6). The position of the annotation region is input by conducting operation of moving and deforming, for example, a rectangular frame body in the image information display field R1. The position of the annotation region is, for example, coordinates of key points (vertices) of the frame body. The input position of the annotation region is transmitted to the information processing device 10 via the network and received by the communication unit 13. The display control unit 111 acquires the position of the annotation region via the communication unit 13. The display control unit 111 generates annotation information including the acquired position of the annotation region, and stores the generated annotation information in the memory 12 in association with the photography ID. As a result, the annotation region DI is set as illustrated in FIG. 3.

Next, in a case where the annotation input instruction has not been acquired (NO in step S5), the processing proceeds to step S8.

Next, the display control unit 111 acquires the annotation message (step S7). The annotation message is input in the annotation information display field R2 as illustrated in FIG. 3. The input annotation message is transmitted to the information processing device 10 via the network and received by the communication unit 13. The display control unit 111 acquires the annotation message via the communication unit 13. The display control unit 111 includes the acquired annotation message in the annotation information generated in step S6 and stores the annotation message in the memory 12.

Next, the display control unit 111 determines whether an end instruction has been acquired (step S8). The end instruction is an instruction to close the display screen G1 displayed in step S3. This instruction is input by performing an operation of pressing an end button (not illustrated) displayed on the display screen G1. In a case where the end instruction is acquired (YES in step S8), the processing ends. In a case where the end instruction is yet to be acquired (NO in step S8), the processing returns to step S3. In this case, the display of the display screen G1 is maintained. The end instruction is transmitted to the information processing device 10 via the network and received by the communication unit 13. The display control unit 111 acquires the end instruction via the communication unit 13.

Figure 8:
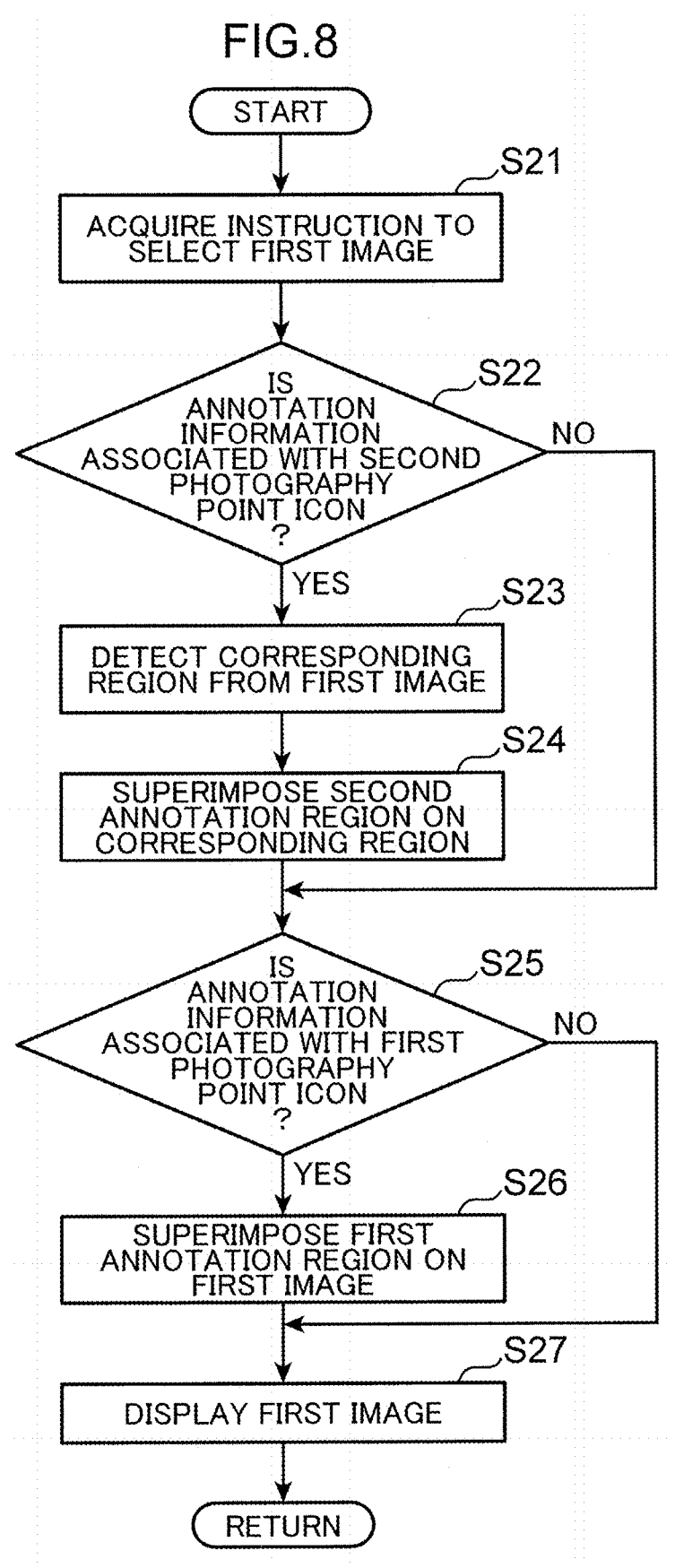
FIG. 8 is a flowchart illustrating details of display processing illustrated in FIG. 7.

FIG. 8 is a flowchart illustrating details of the display processing illustrated in FIG. 7. The display control unit 111 acquires an instruction to select the first image (step S21). This instruction is performed by performing the operation of dragging and dropping the selection icon 201 on the design drawing as illustrated in FIG. 2. As described above, the display control unit 111 decides one photography point icon selected by the user on the basis of the dropping position of the selection icon 201 and the position of the photography point icon 202 as the first photography point icon, and detects an image corresponding to the first photography point icon as the first image.

Next, the display control unit 111 determines whether the annotation information is associated with the second photography point icon (step S22). In a case where the annotation information is associated with the second photography point icon (YES in step S22), the display control unit 111 detects the corresponding region of the second annotation region set in the second image from the first image by the pattern matching described above (step S23). In a case where the annotation information is not associated with the second photography point icon (NO in step S22), the processing proceeds to step S25.

Next, in step S24, the display control unit 111 superimposes the second annotation region on the corresponding region (step S24).

Next, the display control unit 111 determines whether the annotation information is associated with the first photography point icon (step S25). In a case where the annotation information is associated with the first photography point icon (YES in step S25), the display control unit 111 superimposes the first annotation region on the first image (step S26). On the other hand, in a case where the annotation information is not associated with the first photography point icon (NO in step S25), the processing proceeds to step S27.

Next, the display control unit 111 displays the first image in which the first annotation region and the second annotation region are superimposed on each other on the display of the terminal device 30 (step S27). Note that, if NO in step S25, the second annotation region is superimposed on the first image, and the first annotation region is not superimposed on the first image.

Figure 9:
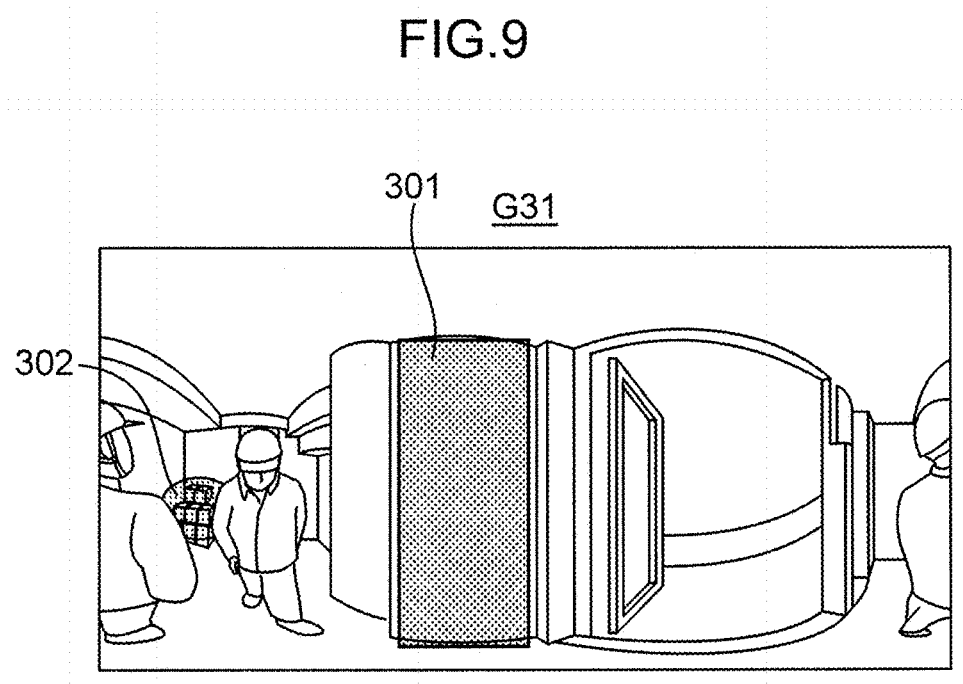
FIG. 9 is still another diagram illustrating an example of the first image displayed on the display.

FIG. 9 is a diagram illustrating still another example of the first image G31 displayed on the display. In the example of FIG. 9, a developed image obtained by developing the entire region of the omnidirectional image is adopted as the first image G31. In the example of FIG. 9, the first annotation region 301 and the second annotation region 302 are set for different subjects. Therefore, in the example of FIG. 9, unlike the example of FIG. 5, the first annotation region 301 and the second annotation region 302 are displayed separately.

In this manner, in the present embodiment, in a case where the annotation information is associated with the second photography point icon within the predetermined range from the first photography point icon corresponding to the first image, the first image is displayed in association with the annotation information. Therefore, the annotation information set to the second image can be checked without separately inputting an operation of closing the first image and displaying the second image while viewing the first image. Since the annotation information can be checked without such an operation, the number of processing steps of the computer spent for the operation is reduced.

Modifications described below can be adopted for the present disclosure.

(1) In FIG. 6, in a case where the annotation information is also set to the second photography point icon 202_2 on the right side of the first photography point icon 202_1, the display control unit 111 may further display the annotation information on the first image. In this case, in the first image, in addition to the second annotation region set to the second image corresponding to the second photography point icon 202_2 on the left side, the second annotation region set to the second image corresponding to the second photography point icon 202_2 on the right side is also displayed to be superimposed on the first image. In a case where the two second annotation regions do not fit within a display region of the first image, the display control unit 111 may reduce the first image so that the two annotation regions fit within the display region at the same time. Alternatively, the display control unit 111 may display the developed image of the first image in order to display the entire region of the first image.

(2) In a case where the first annotation region and the second annotation region do not fit within the display region of the first image, the display control unit 111 may reduce the first image so that the first annotation region and the second annotation region fit within the display region of the first image. Alternatively, the display control unit 111 may display the developed image of the first image in order to display the entire region of the first image.

(3) In a case where a plurality of annotation regions is set in the second image, the display control unit 111 may detect corresponding regions of the plurality of annotation regions set to the second image from the first image by pattern matching, and display the first image in which the plurality of annotation regions set in the second image is superimposed on the plurality of detected corresponding regions.

(4) The display control unit 111 is not required to superimpose the second annotation region on the first image. For example, the display control unit 111 may display a message indicating that the annotation information is set to the second image together with the first image. In this case, the display control unit 111 may display an annotation icon with a balloon mark on an outer frame of the first image. When this aspect is adopted, the user is not required to set the second annotation region to the second image.

(5) The display control unit 111 is not required to superimpose the first annotation region on the first image. For example, the display control unit 111 may display a message indicating that the annotation information is set to the first image together with the first image. In this case, the display control unit 111 is only required to display an annotation icon with a balloon mark on an outer frame of the first image. Furthermore, when this aspect is adopted, the user is not required to set the first annotation region to the first image.

(6) In a case where the annotation message corresponding to the first image is displayed in the annotation information display field R2 and an instruction to select the second annotation region (e.g., tap or click) is input, the display control unit 111 may display the annotation message corresponding to the second annotation region in the annotation information display field R2. In this state, when an instruction to select the first annotation region is input, the display control unit 111 may display an annotation message corresponding to the first annotation region in the annotation information display field R2.

(7) In the above embodiments, the construction site is exemplified as a site, but the present disclosure is not limited to this example, and a manufacturing site, a distribution site, a logistics site, an agricultural land, a civil engineering site, a retail site, an office, a hospital, a commercial facility, a nursing care facility, or the like may be employed as the site.

Figure 10:
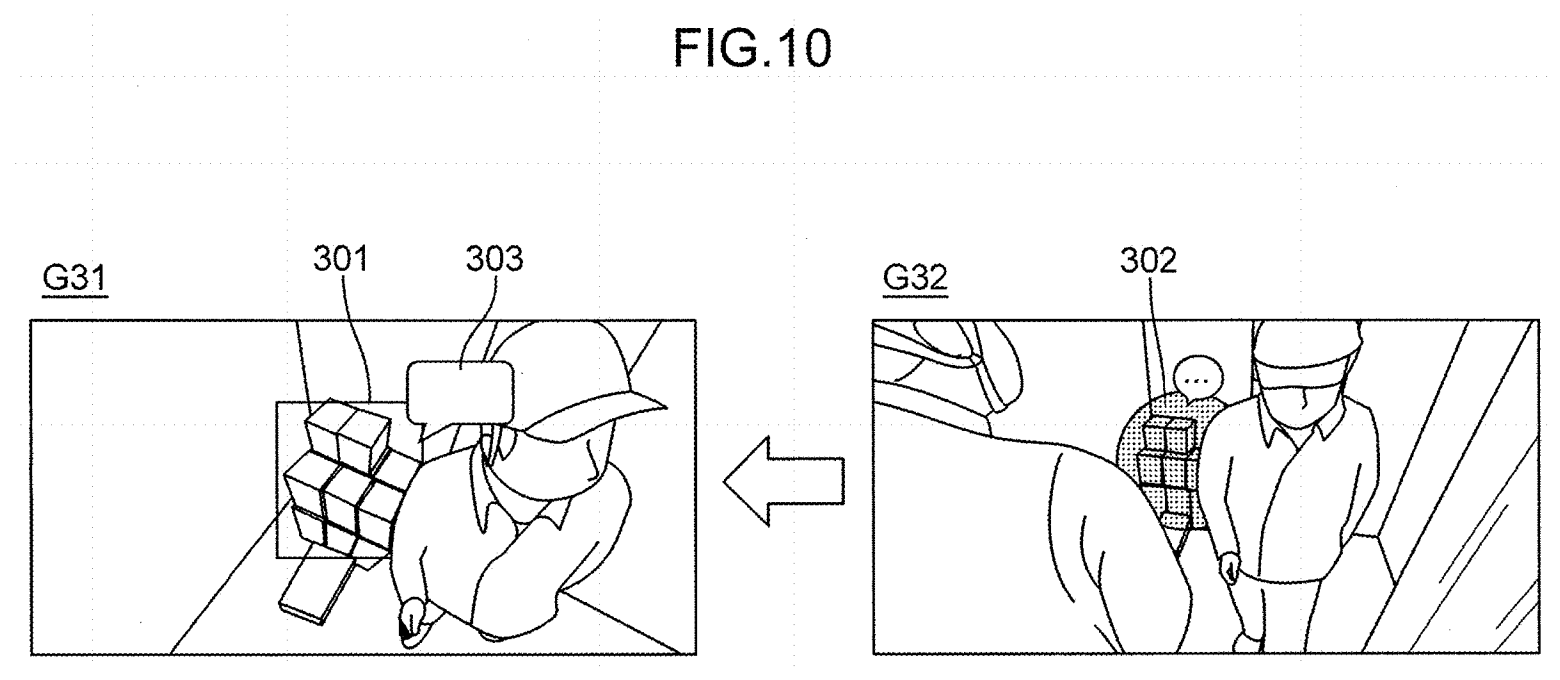

(8) In the example of the first image G31 in FIG. 4, the second annotation region 302 is displayed to be superimposed on the first image G31, but the present disclosure is not limited to this example. For example, instead of displaying the second annotation region 302 on the first image G31, the display control unit 111 may display an annotation icon 303 indicating that an annotation comment is added to the second image G32 on the first image G31 as illustrated in FIG. 10. FIG. 10 is a diagram illustrating an example of a display mode of the first image G31. In FIG. 10, the left side shows the first image G31, and the right side shows the second image G32. The second annotation region 302 is set in the second image G32 adjacent to the first image G31. Furthermore, an annotation message is added to the second annotation region 302.

In this case, the first image G31 displays an annotation icon 303 indicating that an annotation message is added to the second image G32 in association with the first annotation region 301. As a result, the user who has viewed the first image G31 can check at a glance that the annotation message is set to the adjacent image.

Figure 11:
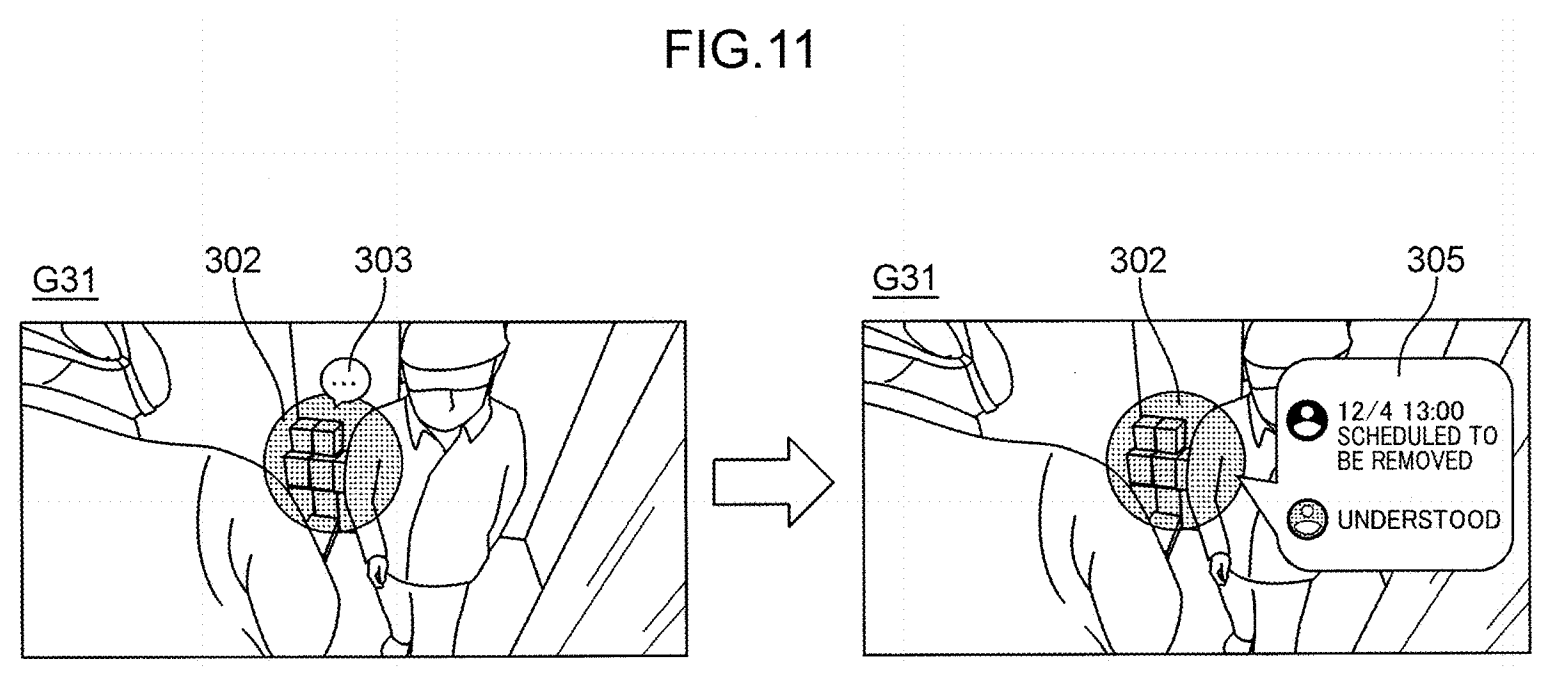

(9) In a case where the second annotation region 302 is superimposed on the first image G31, an annotation icon 304 may be displayed in association with the second annotation region 302. FIG. 11 is a diagram illustrating the first image G31 in which the annotation icon 303 is displayed in association with the second annotation region 302. Note that FIG. 11 does not show the first annotation region 301. When detecting an operation of selecting the annotation icon 303 (e.g., click or tap) as illustrated on the left side in FIG. 11, the display control unit 111 displays an annotation message display field 305 to be superimposed on the first image G31 as illustrated on the right side in FIG. 11. The annotation message display field 305 displays a list of annotation messages added to the second annotation region 302. That is, the annotation message display field 305 lists the annotation messages in the second annotation region 302 listed in the annotation information display field R2 illustrated in FIG. 2. As a result, the user can check the annotation message added to the second annotation region 302 only by inputting an operation of selecting the annotation icon 304 in the first image G31 without displaying the second image G32.

The present disclosure is useful for managing a construction site because the situation of the construction site can be checked remotely.

The invention claimed is:

1. An information processing method in a computer, the method comprising:

displaying, on a display of a terminal device, an overhead view image in which a plurality of photography point icons indicating a photography point are superimposed; and in a case where a selection of a first photography point icon that is one of the plurality of photography point icons is detected, displaying a first image photographed at a photography point indicated by the first photography point icon on the display, wherein the displaying of the first image on the display includes determining whether annotation information is associated with a second photography point icon that is within a predetermined range from the first photography point icon, and upon determination that the annotation information is associated with the second photography point icon, displaying the first image and the annotation information on the display.

2. The information processing method according to claim 1, wherein the annotation information includes a position of an annotation region in which an annotation is set in a second image photographed at a photography point indicated by the second photography point icon, and the displaying of the first image on the display includes detecting a corresponding region corresponding to the annotation region from the first image based on the second image, and displaying, on the display, the first image in which the annotation region is superimposed on the corresponding region.

3. The information processing method according to claim 1, wherein the displaying of the first image on the display further includes in a case where the annotation information is associated with the first photography point icon, displaying the annotation information associated with the first photography point icon and the annotation information associated with the second photography point icon on the display.

4. The information processing method according to claim 1, wherein the annotation information includes a position of a first annotation region indicating a region in which an annotation is set in the first image and a position of a second annotation region in which an annotation is set in a second image corresponding to the second photography point icon, and the displaying of the first image on the display includes detecting a corresponding region corresponding to the second annotation region from the first image based on the second image, and in a case where the first annotation region is set to the first image, displaying, on the display, the first image on which the first annotation region is superimposed and in which the second annotation region is superimposed on the corresponding region.

5. The information processing method according to claim 3, wherein the displaying of the first image on the display further includes displaying the annotation information associated with the first photography point icon and the annotation information associated with the second photography point icon by using different display objects.

6. The information processing method according to claim 1, further comprising displaying a selection icon configured to be movable on the overhead view image, wherein the first photography point icon is decided based on a distance between a movement completion position of the selection icon and each of the plurality of photography point icons.

7. The information processing method according to claim 1, further comprising, in a case where selection of the annotation information displayed on the display is detected, displaying, on the display, an annotation message indicated by the annotation information.

8. An information processing device comprising a processor, wherein the processor executes processing of:

displaying, on a display of a terminal device, an overhead view image in which a plurality of photography point icons indicating a photography point are superimposed; and in a case where a selection of a first photography point icon that is one of the plurality of photography point icons is detected, displaying a first image photographed at a photography point indicated by the first photography point icon on the display, and the displaying of the first image on the display includes determining whether annotation information is associated with a second photography point icon that is within a predetermined range from the first photography point icon, and upon determination that the annotation information is associated with the second photography point icon, displaying the first image and the annotation information on the display.

9. A non-transitory computer readable recording medium storing an information processing program for causing a computer to execute a process of:

displaying, on a display of a terminal device, an overhead view image in which a plurality of photography point icons indicating a photography point are superimposed; and in a case where a selection of a first photography point icon that is one of the plurality of photography point icons is detected, displaying a first image photographed at a photography point indicated by the first photography point icon on the display, wherein the displaying of the first image on the display includes determining whether annotation information is associated with a second photography point icon that is within a predetermined range from the first photography point icon, and upon determination that the annotation information is associated with the second photography point icon, displaying the first image and the annotation information on the display.

* * * * *